Patented Sept. 27, 1932

1,879,874

UNITED STATES PATENT OFFICE

WILLIAM V. KIDDER, OF LA CROSSE, WISCONSIN

LUBRICATING SYSTEM AND PRODUCTS

No Drawing. Application filed October 16, 1931. Serial No. 569,355.

This invention relates to lubricating systems and products, particularly to the lubrication of the journals and other bearing surfaces of internal combustion motors.

The general object of this invention is to attain all the advantages attending the use of colloidal graphite in lubricating oils, but in a more economical manner than heretofore.

A further object is to produce more stable and efficient dispersions of colloidal graphite in lubricating oils by preventing precipitation or floculation of the graphite therein.

Another object is to avoid the stoppage or clogging of screens or of narrow oil ducts due to the said precipitations of colloidal graphite dispersions.

Further objects of the invention will be evident in the following description of my improved system and product.

Colloidal graphite dispersions in lubricating oils have been used rather extensively during the past quarter of a century or more, to decrease the friction and wear of bearing surfaces, since the said material and its use was invented and introduced by Dr. Edward G. Acheson. During all this long lubricating practice, those skilled in the art have always prescribed the use of a minimum of at least .1% of colloidal graphite in a lubricating oil. The concentration generally prescribed has been from .2% to .3%.

I have found, however, that the various above recited objects of my invention are attained by adding the colloidal graphite to lubricating oils in such quantity as to give much lower concentrations of the graphite therein than has heretofore been employed.

When the oil in the crank case of an internal combustion motor is dependent upon for lubrication of its cylinders and pistons, the hereinbefore mentioned concentrations may be desirable, although expensive and attended by some disadvantages.

But in my copending application for U. S. Letters Patent for improvements in lubricating system and products, Serial No. 569,354, filed October 16, 1931, I have disclosed that the lubrication of the cylinders and pistons of automobile and other motors is advantageously accomplished by adding the colloidal graphite dispersion to the motor fuel, rather than to the crank case oil, and by thus introducing it through the carbureter, together with the explosive mixture of air and fuel, into the combustion chamber and to the cylinder walls.

Many tests, extending over hundreds of car miles, show that superior efficiency in lubrication and a superior gasolene economy result from providing, by my inventions, for separate lubrication, with colloidal graphite, of the cylinders and of the crank shaft and connecting rod bearings of internal combustion motors.

For lubrication of the cylinders by the method of my aforesaid copending application, I employ dispersions of colloidal graphite of the customary order of magnitude, although in a diminished quantity than heretofore. But for crank case oil lubricants, depended upon, by the system of this present invention, to lubricate only the lower motor bearings, such as the crank shaft and connecting rods, I find that reduction of the concentration of the colloidal graphite dispersion to between one-half and one-twentieth of that heretofore used is economical and affords many other decided advantages.

As colloidal graphite dispersions are rather expensive, particularly when retailed in small quantities to the automobilist, this element of cost has heretofore hindered the widespread adoption of colloidal graphite lubrication for automobile motors.

Moreover, in many instances, acids are developed in the crank case oil through oxidation, which, it is claimed, floculate or precipitate the colloidal graphite when it is present in crank case oil in concentrations as high as have been employed in the Acheson system. This also impairs the efficiency of the graphite as a lubricant, and, in some instances, causes stoppage of fine oil ducts or passages by the considerable percentage of precipitated graphite.

To provide a more economical and stable graphited oil lubricant for the crank case bearings of motors, I proceed as follows:

I prepare a dispersion of colloidal graphite in a neutral lubricant, preferably in filtered petroleum lubricating oil. Oils of high viscosity may be used for this purpose, although thinner bodied oils may also be employed where conditions indicate their use. The concentration of the dispersion I prefer for use by automobilists and other small users, is about .2% by weight of colloidal graphite, calculated as a solid, compared with the weight of the oil. My invention is not restricted to this concentration in preparing a supply of graphited oil for the more dilute dispersions to be used by automobilists, etc. in the practice of my invention. The concentration specified, however, is convenient because it is of an order which enables sufficiently exact measurement in relatively small quantities, such as 1, 2 or more ounces, by car drivers.

Having thus prepared the supply of colloidal graphite dispersion, I add the same to the lubricating oil in the crank case in the proportion, first, of 8 ounces thereof to each quart of lubricating oil in the crank case, or as it is added thereto. I maintain this concentration in the crank case oil by subsequent additions whenever further oil is added, until the motor has been used for an equivalent of 500 to 1000 car miles, and which is sufficient to establish a graphiod film upon the journals and bushings, etc., of the lower engine bearings. Since 8 ounces of such .2% dispersion containing, therefore, .016 ounces of colloidal graphite, are used in each quart or 32 ounces of lubricating oil, the concentration of the graphite itself in the oil while thus conditioning the lower motor bearings will be .05%.

Thereafter, at all times, and to maintain the graphoid film against wear, I add a much smaller proportion of the colloidal dispersion supply, for example, 2 ounces of .2% dispersion to each quart of lubricating oil in or added to the crank case. The concentration of the colloidal graphite employed in crank case lubricating oils by my invention, after the graphoid film has been initially established, may be, therefore, one-fourth of that above specified for conditioning the motor, namely .0125%. It is possible, in some instances, to further reduce the concentration, for example to .005% of colloidal graphite calculated as a solid, in crank case lubricating oil, so long as the improved system of lubricating the cylinders and pistons disclosed in my aforesaid copending application is employed.

As a result of the very low concentration of colloidal graphite, used by my system, the precipitation or flocculation thereof by any given concentration of acid or other electrolyte which may be in the supply of crank case oil, or which may be formed therein during the operation of the motor, is much less apt to occur or will proceed at a much lower speed of reaction.

It is well known that the speed of reaction of such chemical processes diminishes with diminishing concentration of either of the reacting compounds. The consequence is that little, or in any event, much less precipitated graphite will be developed in the crank case oil by my system, and that, consequently, clogging of screens and of oil ducts will be prevented or minimized.

The elimination of this drawback to the use of colloidal graphite dispersions as heretofore employed and the economy attained by my improved system, have been found to be very useful by automobilists and other users of graphited oils in small quantities.

Although I have described my invention as applied particularly to the lubrication of the crank shafts and connecting rod bearings and similar journal bearings of automobile motors, it will be understood that I do not restrict my system or product thereto, but can use them with other internal combustion motors without departing from the spirit and scope of my invention. Many other forms in which this invention may be embodied will occur to those skilled in the art, and the fact that I have specifically illustrated and described only a few of such forms is not intended as a limitation.

In using the term "a lubricating oil" in my description of my invention and in the claims, I employ that term in its broadest sense to denote any product which has been or might be used as a lubricant for the crank case or other bearings of internal combustion motors; and by the said term I imply straight or blended oils from any source, and also all products resulting from the use of such lubricants, including electrolytes which may originally be present in such oils, which may be added thereto or which may be formed therein during their use, it being understood however, that I refer to the presence of such electrolytes in small amounts.

In this application I do not claim the method of lubricating by addition of the percentages of colloidal graphite specified herein to lubricants, which method I claim in a divisional application hereof, filed June 20, 1932, bearing Serial No. 618,310; neither do I claim herein the lubrication of the cylinders, piston rings and valves of internal combustion engines by the introduction of colloidal graphite into combustion chambers, which method and products therefor I claim in my application Serial No. 569,354, filed October 16, 1931; nor do I claim herein the combination of the two said methods of lubrication described in the specification hereof, and which latter method I claim in my application Serial No. 618,310, filed June 20, 1932.

I claim:

1. A crank case lubricant for internal combustion motors consisting of a lubricating oil and .05 to .005% of colloidal graphite.

2. A crank case lubricant for internal combustion motors, consisting of a lubricating oil and approximately .01 per cent of colloidal graphite.

3. A non-clogging graphited lubricant consisting of a lubricating oil and .05 to .005% of colloidal graphite.

4. A non-clogging graphited lubricant consisting of a lubricating oil and approximately .01% of colloidal graphite.

5. A graphited lubricant consisting of a filtered lubricating oil and .05 to .005% of colloidal graphite.

6. A graphited lubricant consisting of a filtered lubricating oil and approximately .01% of colloidal graphite.

7. A graphited lubricant consisting of a filtered lubricating oil and a dispersion of colloidal graphite therein not exceeding .05% by weight.

In testimony whereof I affix my signature.

WILLIAM V. KIDDER.